April 27, 1965  E. L. McFERREN  3,180,187
FACING HEAD ATTACHMENT
Filed June 29, 1962  4 Sheets-Sheet 1
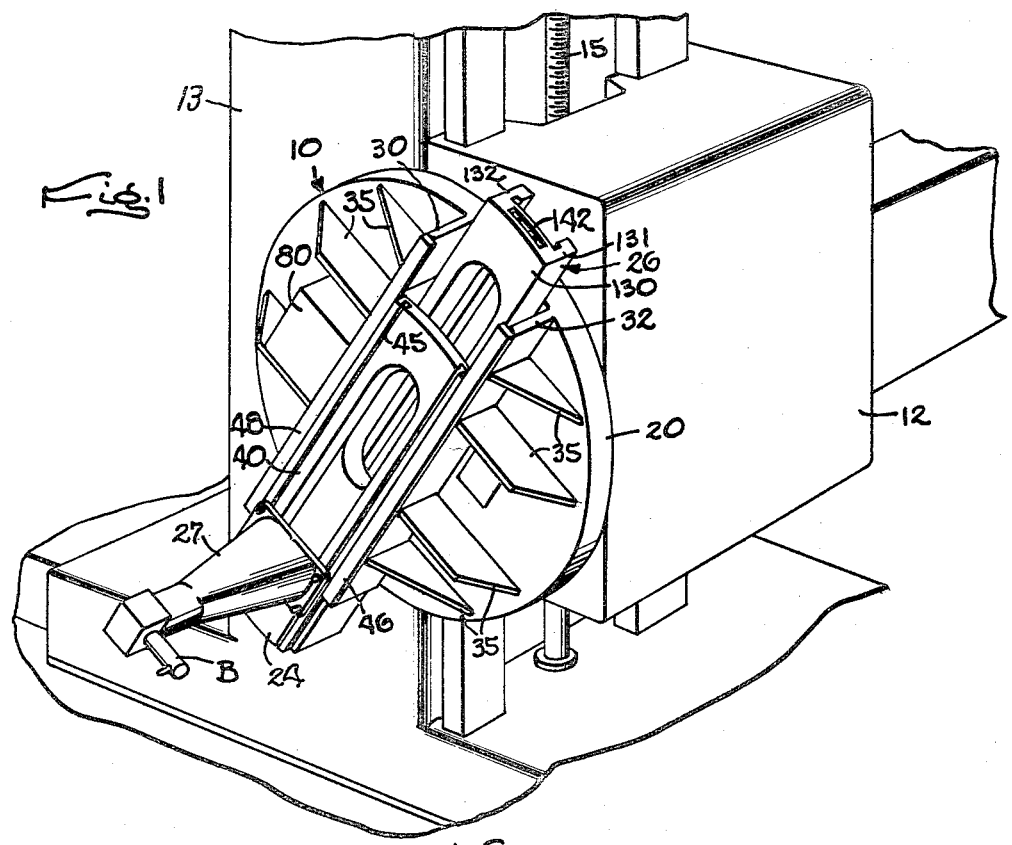
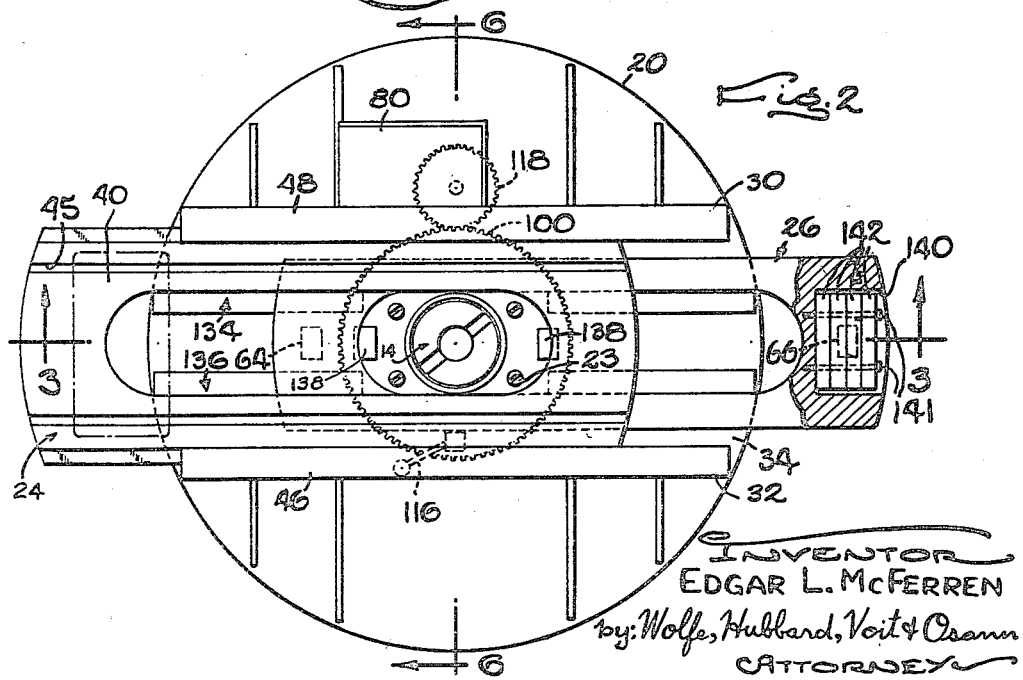
INVENTOR
EDGAR L. McFERREN
by: Wolfe, Hubbard, Voit & Osann
ATTORNEYS

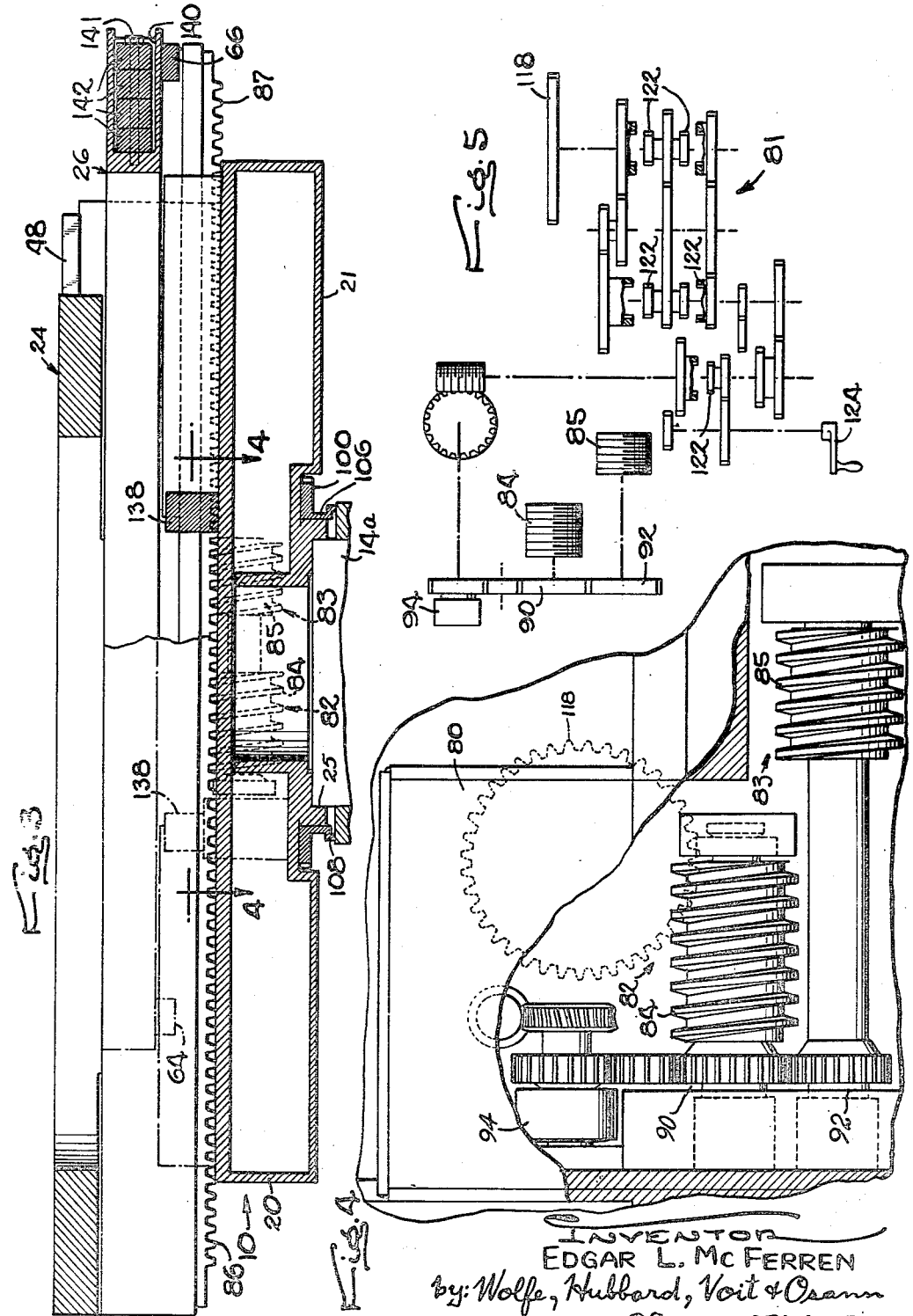

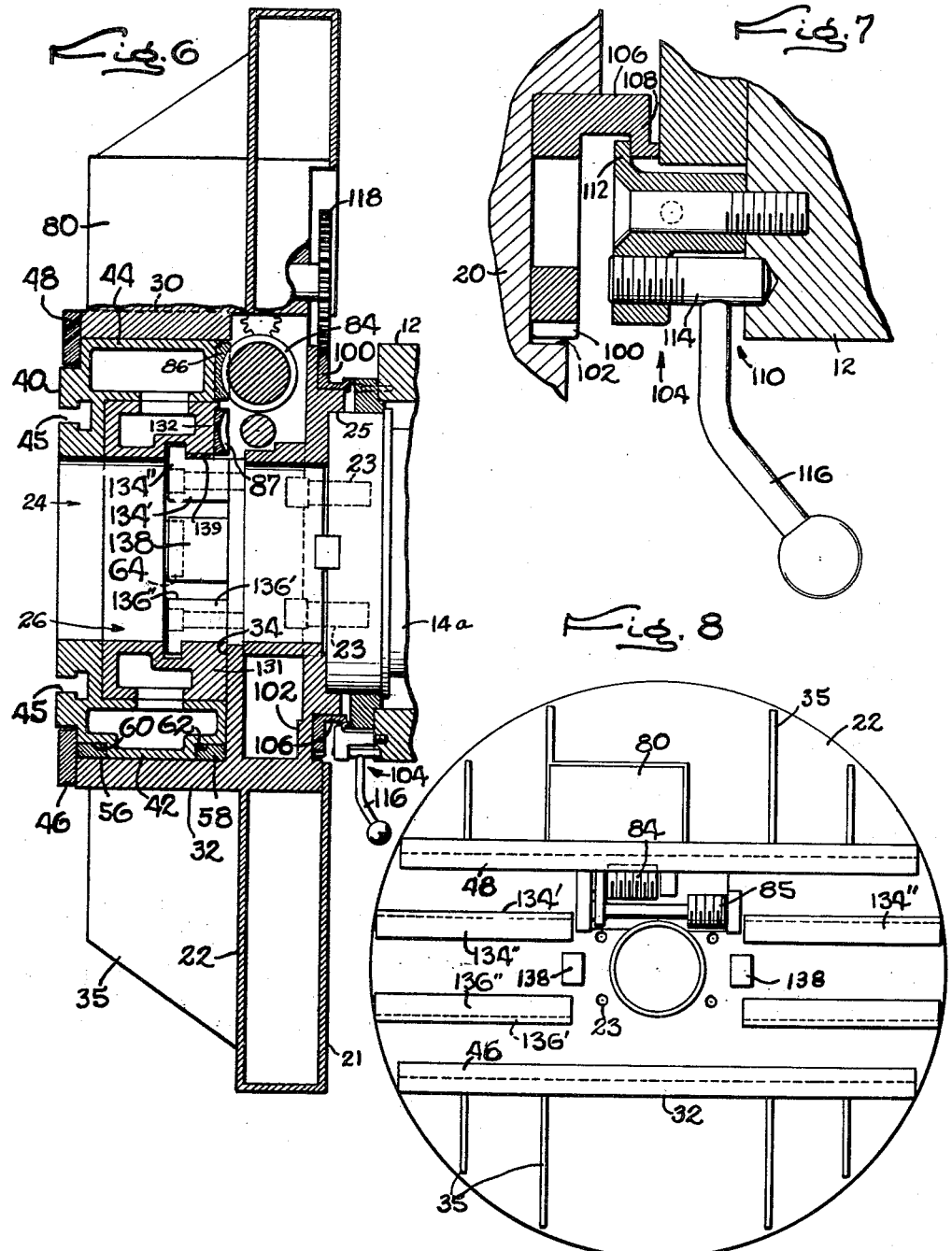

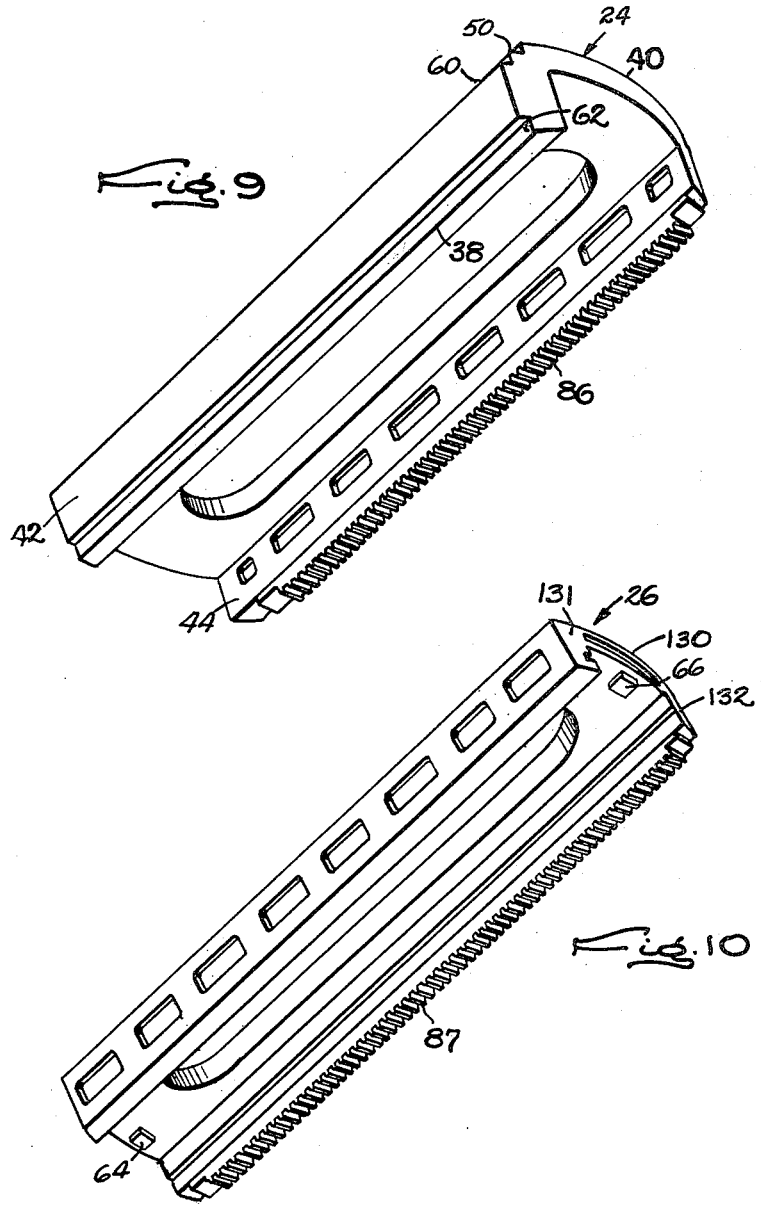

United States Patent Office 3,180,187
Patented Apr. 27, 1965

3,180,187
FACING HEAD ATTACHMENT
Edgar L. McFerren, Fond du Lac, Wis., assignor to Giddings & Lewis Machine Tool Company, Fond du Lac, Wis., a corporation of Wisconsin
Filed June 29, 1962, Ser. No. 206,337
13 Claims. (Cl. 82—1)

The present invention relates generally to machine tools and, more particularly, to improvements in large rotating facing head attachments having a toolslide and counterbalance means therefor mounted for relative translational movement on the head.

One object of the invention is to provide a facing head attachment capable of operating with greater accuracy and at higher rotational speeds than obtainable with those facing head attachments heretofore known.

Another object of the invention is to combine into a unitary assembly in such facing head attachment the toolslide and counterbalance means therefor so as to afford more rigid support for these relatively movable members while facilitating precision adjustment thereof.

A further object is to provide a facing head attachment of the character set forth wherein the toolslide and counterbalance means are rigidly and independently supported in telescoping relation with each other for relative movement in opposite directions on a common axis, resulting in maximum effective support for the toolslide and counterbalance means without unduly limiting their travel.

Still another object of the invention is to provide a counterbalanced toolslide on a facing head wherein the counterbalance does not interfere in any manner with the operation of the toolslide or the facing head attachment assembly generally.

It is another object of the present invention to provide a facing head attachment which is rigidly constructed to withstand shock loads which become more severe as the toolslide is extended radially to position the cutting tool beyond the edge of the head.

Still another object of the present invention is to provide a facing head attachment wherein the toolslide and counterslide, and supports therefor, are constructed to provide dynamic balance with cutting tools of different configuration carried by the head.

The foregoing and other objects and advantages will become more apparent from the following detailed description, when read in conjunction with the appended drawings, wherein:

FIGURE 1 is a perspective view of a column and headstock assembly for a machine tool having a facing head attachment mounted on the headstock, which attachment illustratively embodies one form of the present invention;

FIG. 2 is a front elevation of the headstock attachment of FIG. 1;

FIG. 3 is an enlarged fragmentary sectional view of the facing head of FIG. 2 taken along line 3—3 of FIG. 2;

FIG. 4 is a further enlarged fragmentary sectional view of a portion of the facing head taken along line 4—4 of FIG. 3;

FIG. 5 is a schematic representation of an exemplary transmission for providing motive power to the facing head elements;

FIG. 6 is an enlarged fragmentary sectional view taken along lines 6—6 of FIG. 2;

FIG. 7 is a further enlarged fragmentary sectional view detailing that portion of FIG. 6 illustrating the clamping arrangement between the headstock and facing head;

FIG. 8 is an elevation view similar to that of FIG. 2 with certain of the movable slide elements removed to provide a better view of the face of the device;

FIG. 9 is an enlarged perspective view of the toolslide of the illustrative facing head attachment shown in FIG. 1; and FIG. 10 is a similar perspective view of the counterslide of the facing head attachment shown in FIG. 1.

While the invention is susceptible of various modifications and alternative constructions, an illustrative embodiment has been shown in the drawings and will be described below in considerable detail. It should be understood, however, that there is no intention to limit the invention to the specific form disclosed, but, on the contrary, the intention is to cover all modifications, alternative constructions and equivalents falling within the spirit and scope of the invention, as expressed in the appended claims.

Referring more particularly to FIGURES 1 and 2, the invention is there exemplified in a novel facing head attachment 10 which in this instance is mounted for rotation on the horizontal spindle 14 presented by the headstock 12 of a machine tool. The latter happens to be a horizontal boring and milling machine having a base portion with an upright column 13 on which the headstock 12 is slidably mounted for vertical movement. A power-driven elevating screw 15 is provided for positioning the headstock vertically on the column and thereby positioning a cutting tool carried by the facing head attachment 10 relative to a workpiece (not shown) supported for machining purposes adjacent the column.

The facing head attachment 10 has a variety of uses, among which it is adapted to support and operate a cutting tool, designated generally by the letter B, to take a circular cut from a relatively large workpiece anywhere from a few inches in diameter up to many feet in diameter. Preferably it is constructed for relatively high-speed operation and is capable of taking a rough cut for removing metal and taking a very fine cut for finishing the piece. Among other uses, the facing head attachment is adapted to support a facing tool which is translated radially at relatively slow feed rates across the head while the latter is rotated to take a facing cut. These and other machining operations require rigid cutter support while permitting precise cutter adjustment.

The facing head attachment 10 is constructed with a relatively massive circular, disk-shaped body 20 which may be formed as a hollow shell. The body or shell may, for example, be as large as six feet in diameter or even larger. The body 20 has a rearward or mounting face 21 which is adapted to be fixed directly to the machine tool spindle 14, and a forward or cutting face 22 on which a cutting tool is supported.

The attachment 10 in this instance is fixed directly to the end of spindle drive sleeve 14a (FIG. 6) for rotation thereby, by means such as mounting bolts 23 extending through the rearward face 21 of the body and fastening into the spindle drive sleeve. The attachment 10 is centered on the latter by means of a shallow bore 25 in the rearward face of the body and which fits closely on the outward end of the spindle drive sleeve.

On the forward face 22 of the shell or body 20, there is mounted a toolslide assembly including a toolslide 24 and counterslide 26 which serves as a counterbalance for the toolslide. The toolslide and counterslide are simultaneously translatable on the head in opposite radial directions.

The toolslide 24 supports the cutting tool B by means such as a tool post 27. The toolslide 24 is adjustable radially to position the cutting tool, and is counterbalanced at all positions of translation by the counterslide 26.

In keeping with the invention, the toolslide 24 and counterslide 26 are rigidly and independently supported in telescoping relation with each other for relative translational movement in opposite directions on a common axis, resulting in maximum effective support for these members without unduly limiting their travel. The toolslide and counterslide 24, 26 are, accordingly, telescoped one within the other and independently supported for translation in a diametrically disposed channel formed on the forward face 22 of the shell or body 20. The channel is defined by a pair of laterally spaced projecting sidewalls 30, 32 and a heavy floor portion 34. The latter, as well as the inside faces of the channel sidewalls, are finished to provide bearing surfaces. An opening in the floor, which extends through the body and into the central bore 25, gives access to the spindle 14 and its socket. The spindle 14 is rotatable with and axially extendable with respect to the spindle drive sleeve 14a in a well-known manner. By reason of this construction, the spindle 14 may be extended through the facing head attachment for use conjointly with the facing head, or independently thereof and in such a manner that it would be inefficient to remove the facing head in order to allow use of the boring bar.

A number of transverse supporting ribs 35 are secured on the face 22 of the body and fixed to the channel sidewalls at spaced intervals along their respective lengths. The ribs 35 provide added rigidity to the sidewall structure and insure against any tendency the walls may have to bend or flex outward under loads which may be brought to bear on them in that direction.

Turning now to FIGS. 6, 9 and 10 for further details of the toolslide assembly, the toolslide 24 and counterslide 26 are nested in the channel formed by the sidewalls 30, 32 and floor 34. To this end, the toolslide has a generally U-shaped profile, comprising a flat, elongated plate 40 formed with a pair of depending legs 42, 44 extending along both sides of the plate and slidable along the bearing surfaces of the channel sidewalls and floor. The counterslide 26 is slidably received between the legs 42, 44 of the toolslide 24, with a running clearance between the adjacent surfaces thereof.

The outer surface of the plate 40 is formed with two parallel T slots 45 for mounting the tool post 27, illustrated in FIG. 1. The tool post is movable to any convenient position along the length of the toolslide where it may be secured by drawing up on bolts having heads fitted in the T slots.

The toolslide 24 is dimensioned to have slidable bearing engagement with the channel sidewalls 30, 32, and the floor 34, being retained in contact therewith by a pair of cleats or retainer plates 46, 48. Each of the latter is fixed to the top of its respective supporting sidewall and extends inward towards the other, fitting respectively into grooves 50, 52 at the edges of the toolslide 24 and extending the length thereof. A number of tapered gibs 56, 58 are provided along one sidewall 32 of the channel and project into mating grooves 60, 62 on one of the legs 42 of the toolslide 24 so as to take up the clearance between the sidewalls and the slide. Thus, when the toolslide is mounted in the channel and adjusted, it is free to move in a longitudinal direction only, there being no room for play or looseness of the slide in the channel, and the sidewalls and the floor of the channel serve as bearing surfaces upon which the associated surfaces of the toolside are free to move with minimum frictional drag. Appropriate stop means define the limits of diametrical travel of the toolslide and counterslide in the channel.

Further in keeping with the present invention, the facing head attachment 10 includes means affording power adjustment of the toolslide assembly. Thus, a cutting tool such as the tool B may be adjusted to various fixed positions spaced from the center axis of the facing head to take different size circular cuts. With a cutting tool, such as a facing tool, mounted on the head, the toolslide assembly may be power operated to feed the facing tool radially of the head at a continuous feed rate while the attachment is rotating and the facing tool is in cutting engagement with the workpiece to take a facing cut. To this end, power adjustment of the toolslide assembly is effected by transmitting power derived from the spindle drive sleeve 14a to the toolslide and the counterslide. A transmission housing 80 formed on the facing head laterally adjacent the left-hand channel sidewall 30, as viewed in FIG. 1, houses such transmission 81.

Rotation of the facing head by the spindle drive sleeve 14a is translated into linear movement of the toolslide and counterslide by means of worm drives 82, 83. As shown in FIGS. 3-6, the transmission includes a pair of output worms 84, 85 associated respectively with racks 86, 87 on the toolslide 24 and counterslide 26. The toolslide, as shown in FIG. 9, is formed with a rack 86 in the bottom of one of the leg portions 44, this rack 86 being in driving engagement with one output worm 84 of the transmission. The output worm 84, as shown in FIGS. 6 and 8, protrudes from an opening provided for this purpose in the floor of the channel near the center thereof. The counterslide 26, as shown in FIG. 10, is also formed with a rack 87 along one of its leg portions, and such rack is in driving engagement with the other output worm 85 of the transmission. The output worm 85 is mounted laterally of the toolslide worm 84 and similarly protrudes through the floor of the channel.

The output worms 84, 85, as appears most clearly in FIGS. 4 and 5, are connected to counter-rotating spur gears 90, 92, to obtain the requisite opposite simultaneous movement of the toolslide and counterslide. These spur gears are included in a spur gear train which is in driving connection with the transmission through a safety clutch 94, which prevents damage to the drives due to unexpected excessive loading on them. It will be appreciated that any number of gear combinations and arrangements will occur to those skilled in the transmission art to secure any desired feed rates of the toolslide and counterslide. It is important to point out, however, that any transmission should be as compact as possible and located as nearly as possible to the center of rotation of the attachment so as to keep dynamic balancing problems to a minimum. Also, it is desirable, in keeping with the invention, to provide a wide range of speeds at the driving worms so that at any given speed of rotation there is a wide choice of rates of advancement of the toolslide and counterslide. In the present instance, a nine-speed transmission is utilized (schematically illustrated in FIG. 5), including a reverse gear and a back gear arrangement.

In order to drive the output worms 84, 85 through the transmission while the facing head is being rotated by the spindle, the attachment 10 includes means for selectively fixing an element of the transmission to a stationary part of the machine tool to provide a reaction member. The reaction member, in the present case, is a ring gear 100 journaled on a collar 102 (FIGS. 6 and 7) mounted on the rearward face 21 of the body or shell 20 at about the center of rotation thereof. The ring gear 100 is normally free to rotate with the facing head, but may be selectively clamped to the headstock, which serves as the stationary member whenever it is desired to provide power to adjust or feed the toolslide assembly. A particularly effective clamp assembly 104 for this purpose is shown in FIGS. 6 and 7. From these figures it will be seen that the reaction gear 100 is formed with an axially extending flange 106 about its internal diameter which provides a reasonably large bearing area upon which the gear rides when there is relative velocity between it and the facing head. At the outer end of the flange there is an inwardly turned circumferential portion 108 which is in close proximity to the stationary spindle carrier or headstock. The clamp 110 of the clamp assembly is mounted to the headstock and includes a jaw portion 112 which overlies the inturned portion 108 at the end of the flange. The clamp operates in a manner similar to a vise, in that it includes a rotatable stud 114 which is screwed into the jaw portion. By rotating the stud 114 with the handle 116, the jaw is caused to clamp the portion 108 of the ring gear 100 between it and the headstock where it is held stationary.

It will thus become apparent that when the facing head is rotated by the spindle it will carry with it the transmission 81, including an input gear 118 which meshes with the reaction gear 100 and, therefore, will be caused to rotate due to its mesh with the reaction gear 100 as it is orbited about the latter. As the input gear 118 rotates, power is conveyed through the transmission gears to the output worms 84, 85 via a particular train of gears which has been preselected to give the desired rate of toolslide and counterslide translation. Preselection of the transmission gears is made by means of the clutches 122 of the transmission which are manually preset through any suitable actuating means, as, for example, by means of an actuating handle 124 mounted on one side of the transmission housing and coupled to the clutches 122 of the transmission.

It will be appreciated that the attachment is of heavy construction as is the toolslide assembly and, if high speeds of rotation are to be attained, and if vibration is to be minimized at all speeds so as to permit accurate machining of the workpiece, rotational unbalance must be minimized. To this end, the facing head 10 is constructed as a dynamic balanced unit. The toolslide 24, however, tends to create continuous changes in the balance of the head as the toolslide is moved radially. Thus, in keeping with the present invention, the counterslide 26 is moved simultaneously in the opposite radial direction to the toolslide and counterbalances the latter throughout its range of movement. While the operation of the counterslide from the transmission 81 will be clear from the foregoing description, details of construction of the counterslide will now be set forth, since the configuration of the counterslide and the distribution of its weight and intimate association in nested relationship with the toolslide are considered important features of the invention.

In the present instance, the counterslide 26 comprises a U-shaped structure substantially as seen in FIG. 10, having an elongated plate portion 130 with two hollow legs 131, 132, depending from the longitudinal edges of the plate 130.

Dimensionally, the counterslide 26 is adapted to fit in the channel between the legs 40, 42 of the toolslide. It is constructed to be similar in shape, having substantially the same weight per unit length as the toolslide, although being dimensionally more compact so that it can fit within it.

In positioning the counterslide 26 within the toolslide 24, it is a feature of the invention that the two are slidably supported independently of one another, clearance being provided between their adjacent surfaces. The counterslide 26 is supported for sliding movement longitudinally of the channel by two pairs of parallel guideways or rails 134, 136 disposed inwardly of the legs 131, 132 and secured to the channel floor with one pair on each side of the central opening in the latter. The rails 134, 136 give substantial bearing surface for the counterslide 26 over much of its length so that ample support is available at any position assumed by the counterslide throughout its range of sliding movement.

As illustrated more particularly in FIGS. 6 and 8, each rail 134, 136 is generally L-shaped in cross section and comprises a support or base portion 134', 136' with a transverse portion 134", 136" formed therewith. The rails are secured to the floor of the channel by means such as heavy recessed cap screws as shown in FIG. 6. The transverse portions of the rails (FIG. 6) project outwardly away from the diameter of the facing head, and into an associated longitudinal groove provided on the inside of each leg of the counterslide. Tapered positioning gibs 139 are provided on the base portion of at least one alined set of rails between the latter and the adjacent leg of the counterslide to eliminate lateral play within the confining supports. The undersurfaces of the transverse portions of the rails 134, 136 and the surfaces of their base portions in contact with the counterslide 26 are finished so as to provide bearing support for the counterslide. As previously noted, the floor of the channel also supports the counterslide 26 and is in constant bearing relation with the bottom portions of the legs of the latter.

In order to maintain the requisite dynamic balance of the facing head attachment, the counterslide 26 is moved simultaneously with the toolslide 24, but in the opposite direction. Thus, the counterslide worm 85 is parallel with the worm 84 which drives the toolslide and is mounted on a shaft which has a drive pinion 92 thereon in constant engagement with the associated pinion 90 on the shaft of the other worm. The pinions, being of equal size and intermeshed, drive their respective worms at equal speeds, but in opposite directions. Thus, it will be seen that the toolslide and counterslide are advanced or retracted telescopically with relative translational movements in opposite directions along a common axis running diametrically of the facing head.

For defining the limits of relative translational movement of both the toolslide 24 and counterslide 26, resort is had to stop means (FIGS. 2, 3, 6 and 8) comprising a pair of abutments 138 fixed to the channel floor and a pair of cooperating abutments 64, 66 fixed to the bottom of the counterslide. The abutments 138 are fixed in longitudinally spaced, straddling relation with the central opening in the channel floor in position to intercept respective ones of the abutments 64, 66 projecting toward the channel floor. By reason of the mechanical drive connection between the toolslide 24 and the counterslide 26, arresting the translational motion of the latter also serves to arrest the translational motion of the former.

Since, in operation, the toolslide conventionally carries a tool post and cutting tool which would tend to throw the device out of balance, cavities 140 are provided in the plate portion at either end of the counterslide. A plurality of stringer or mounting bolts 141 are positioned therein for supporting counterbalance weights 142 which are inserted to counterbalance the fixed deadweight of the tool post and cutting tool assembly. In this manner, any additional weight which is placed on the toolslide may be easily balanced by placing sufficient weight on the appropriate cavity in the counterslide.

As above noted, the plate portions of the toolslide and counterslide respectively, are formed with elongated central openings which provide direct access through the facing head attachment to the spindle 14. Thus, a tool may be mounted in the spindle and, protruding from the forward end of the facing tool attachment, may be used for carrying out machining operations while the attachment is still in place. Such a provision enables machining operations to be carried out using a tool in the spindle in instances where the facing attachment will not interfere with the workpiece and where it is convenient or desired to operate the tool without first removing the attachment.

I claim as my invention:

1. In a rotatable facing head attachment for a machine tool, the combination comprising a body, means defining a substantially rectangular channel diametrically disposed on the front of said body, a toolslide member slidably supported in said channel and adapted to carry a cutting tool in a radial path and further adapted to project the same beyond the circumferential edge of said body, a counterslide member slidably supported within said channel in telescoping relation within said toolslide member, power transmission means connected to simultaneously move said toolslide and counterslide members in opposite radial directions along said channel so as to dynamically balance the facing head at all radial positions of said cutting tool, and stop means interposed between said body and one of said members and adapted to define the limits of radial movement of both said members.

2. In a rotatable facing head attachment for a machine tool, the combination comprising means defining a channel diametrically disposed on the face of said attachment including a pair of sidewalls chordally disposed thereon and a channel floor, an elongated toolslide disposed in said channel and having a plate portion with a pair of legs projecting into sliding bearing relationship with said sidewalls and said floor, said legs of said toolslide defining an axial recess, a counterslide slidably disposed in said recess, and power transmission means connected to move said toolslide and counterslide in opposite radial directions while continuously determining relative axial positions maintaining the head in dynamic balance.

3. In a rotatable facing head attachment for a machine tool, the combination comprising means defining a channel diametrically disposed on the face of said attachment including a pair of sidewalls chordally disposed thereon and a channel floor, an elongated toolslide disposed in said channel and having a plate portion with a pair of legs projecting into bearing relationship with said sidewalls respectively, said legs of said toolslide defining an axial recess, a counterslide slidably disposed in said recess, stop means in said channel cooperating with means on said toolslide and counterslide for defining the radial limits of movement of the respective slides, and power transmission means connected to move said toolslide and counterslide in opposite radial directions to the limits defined by said stop means while continuously maintaining the head in dynamic balance.

4. In a rotatable facing head attachment for a machine tool, the combination comprising, means defining a relatively deep channel disposed along a diameter of the head, a toolslide of generally U-shaped cross-section slidably disposed in said channel, said toolslide and said channel together defining a longitudinally extending recess, a counterslide of generally U-shaped cross-section slidably disposed within said recess in telescoping relation with said toolslide, and power transmission means mounted on said head and engageable with said toolslide and counterslide respectively, said power transmission means being adapted to feed said toolslide continuously in a radial path defined by said channel and at the same time to continuously drive the counterslide in the opposite radial direction along said path so as to maintain the facing head dynamically balanced.

5. A facing head attachment for a machine tool spindle and comprising, in combination, a generally circular disk-shaped body adapted to be mounted on said spindle for rotation therewith, said body having a forward transverse face, a first bearing means on said face defining a diametrical path thereon, a toolslide mounted in sliding engagement with said first bearing means, said toolslide being adapted to carry a cutting tool thereon, a second bearing means on said face, a counterslide mounted in telescoping relation within said toolslide and in sliding engagement with said second bearing means, and drive means interconnecting said toolslide and said counterslide such that movement of the former in one radial direction is counterbalanced by movement of the latter in the opposite radial direction.

6. In a rotatable facing head attachment for a machine tool, the combination comprising means defining a substantially rectangular channel diametrically disposed on the front of the facing head, a toolslide slidably received in said channel and adapted to carry a cutting tool in a radial path and further adapted to project the same beyond the circumferential edge of the facing head, a counterslide slidably disposed within said channel in telescoping relation with said toolslide, and power transmission means including a pair of laterally spaced worm drives rotatably interconnected, a pair of toothed racks disposed respectively on said toolslide and said counterslide in engagement with said worm drives whereby said toolslide and said counterslide are simultaneously moved by said transmission means in opposite radial directions along said channel so as to dynamically balance the facing head at all radial positions of said cutting tool.

7. In a rotatable facing head attachment for a machine tool, the combination comprising means defining a channel diametrically disposed on the face of said attachment including a pair of sidewalls chordally disposed thereon and a channel floor, an elongated toolslide disposed in said channel having a plate portion with a pair of legs projecting into bearing relationship with said sidewalls respectively, said legs of said toolslide defining an axial recess, a counterslide slidably disposed in said recess, stop means in said channel cooperating with means on said toolslide and counterslide for defining the radial limits of movement of the respective slides, and power means including a first worm drive, a second worm drive laterally spaced from said first worm drive and interconnected therewith so that the first is rotatable in a direction opposite to the second, toothed racks formed on said toolslide and said counterslide respectively and engaged with said worm drives, whereby said toolslide and counterslide are moved in opposite radial directions to the limits defined by said stop means while continuously remaining in relative axial positions for maintaining said attachment in dynamic balance.

8. An attachment for a machine tool spindle comprising, in combination, a generally circular body adapted to be mounted on said spindle for rotation therewith, said body having a forward transverse face, means defining an upstanding channel on said face with a diametrical path therein, a toolslide mounted in bearing relation in said channel, said toolslide being adapted to carry a cutting tool thereon, a counterslide in said channel in telescoping relation within said toolslide, a first worm drive disposed in said body, a second worm drive laterally spaced from said first worm drive in said body, a pair of toothed racks formed on said toolslide and said counterslide respectively and engaged with corresponding ones of said worm drives, and means adapted to drive said worm drives in opposite directions such that the movement of the toolslide is equivalent in speed but opposite in direction to the movement of said counterslide, whereby movement of the former is continuously counterbalanced by the movement of the latter to provide constant dynamic balance of said attachment.

9. In a rotatable facing head attachment for a machine tool, the combination comprising means defining a channel diametrically disposed on the face of said attachment including a pair of sidewalls chordally disposed thereon and a channel floor, an elongated toolslide disposed in said channel and having a plate portion with a pair of legs projecting into bearing relationship with said sidewalls and said channel floor, said legs of said toolslide defining an axial recess, a counterslide slidably disposed in said recess, guide means on said channel floor independent of said toolslide, said guide means engaging said counterslide in bearing relation for positioning said counterslide in said channel independently of said toolslide, and power transmission means connected to move said toolslide and counterslide in opposite radial directions while continuously determining relative axial positions maintaining the head in dynamic balance.

10. In a rotatable facing head attachment for a machine tool, the combination comprising a generally circular body, means defining a diametrical channel on the face of said body including a pair of laterally spaced sidewalls and a channel floor therebetween, an elongated toolslide disposed in said channel means and having a plate portion with a pair of legs projecting into bearing relationship with said sidewalls, said legs of said toolslide defining an axial recess, a counterslide slidably disposed in said recess, parallel guide members having transversely facing bearing portions disposed longitudinally on said channel floor, means defining grooves in said counterslide for receiving said bearing portions for positioning said counterslide with respect to said channel independently of said toolslide, stop means in said channel co-operating with means on said toolslide and counterslide for defining the radial limits of movement of the respective slides, and power transmission means connected to move said toolslide and counterslide in opposite radial directions to the limits defined by said stop means while continuously determining relative axial positions maintaining the head in dynamic balance.

11. In a rotatable facing head attachment for a machine tool having a traversable toolslide diametrically disposed in bearing slideways thereon, said toolslide being movable in said bearing slideway across and beyond said facing head, the improvement comprising a counterslide telescopically mounted within said toolslide, said counterslide being mounted independently of said toolslide and being movable in a direction opposite to the movement of said toolslide for counterbalancing the same when said facing head is rotated.

12. A facing head attachment for a machine tool having a spindle comprising, in combination, a body adapted to be mounted on said spindle for rotation therewith, said shell having a forward transverse face, means defining a channel on said face with a diametral path therein, a toolslide of a length approximating that of the diameter of said attachment and mounted in bearing relation in said channel, said toolslide being adapted to carry a cutting tool thereon, a counterslide of a length approximately the diameter of said attachment mounted in said channel in telescoping relation within said tool slide, and drive means interconnecting said toolslide and said counterslide such that movement of the former in one radial direction is counterbalanced by movement of the latter in the opposite radial direction.

13. In a rotatable facing head attachment for a machine tool, the combination comprising a body, a toolslide mounted on said body in sliding bearing engagement therewith, means for securing a cutting tool to said toolslide, a counterslide mounted on said body in sliding bearing engagement therewith independent of the sliding bearing engagement of said toolslide, said counterslide being disposed in telescoping relation within said toolslide for movement along a common axis running diametrically of said body, and power means interconnecting said toolslide and said counterslide and adapted to move them in opposite directions along said common axis so that said toolslide and counterslide remain dynamically balanced at all times within their limits of movement.

References Cited by the Examiner
UNITED STATES PATENTS

| | | | |
|---|---|---|---|
| 2,325,294 | 7/43 | Woytych | 82—2 X |
| 2,476,255 | 7/49 | Berthiez | 82—2 X |
| 2,831,386 | 4/58 | Woytych | 82—2 |

WILLIAM W. DYER, Jr., *Primary Examiner.*